(12) United States Patent
Tirumala et al.

(10) Patent No.: US 12,271,765 B2
(45) Date of Patent: Apr. 8, 2025

(54) TECHNIQUES FOR EFFICIENTLY SYNCHRONIZING MULTIPLE PROGRAM THREADS

(71) Applicant: NVIDIA CORPORATION, Santa Clara, CA (US)

(72) Inventors: Ajay Sudarshan Tirumala, San Jose, CA (US); Olivier Giroux, Santa Clara, CA (US); Peter Nelson, San Francisco, CA (US); Gary M. Tarolli, Hanalei, HI (US); Ankita Upreti, Austin, TX (US); Konstantinos Kyriakopoulos, Baden Wurttemberg (DE); Divya Shanmughan, Santa Clara, CA (US); Rishkul Kulkarni, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 508 days.

(21) Appl. No.: 17/338,377

(22) Filed: Jun. 3, 2021

(65) Prior Publication Data
US 2022/0391264 A1  Dec. 8, 2022

(51) Int. Cl.
*G06F 9/52* (2006.01)
*G06F 9/30* (2018.01)
(Continued)

(52) U.S. Cl.
CPC ............. *G06F 9/52* (2013.01); *G06F 9/3001* (2013.01); *G06F 9/30058* (2013.01); *G06F 9/3851* (2013.01); *G06F 9/3888* (2023.08); *G06F 9/48* (2013.01); *G06F 9/4843* (2013.01); *G06F 9/4881* (2013.01); *G06F 9/50* (2013.01); *G06F 9/5005* (2013.01); *G06F 9/5027* (2013.01); *G06F 9/5038* (2013.01); *G06F 9/522* (2013.01)

(58) Field of Classification Search
CPC ........ G06F 9/48; G06F 9/4843; G06F 9/4881; G06F 9/50; G06F 9/5005; G06F 9/5027; G06F 9/5038; G06F 9/52; G06F 9/522; G06F 9/3001; G06F 9/30058; G06F 9/3009
See application file for complete search history.

(56) References Cited

U.S. PATENT DOCUMENTS

| | | | |
|---|---|---|---|
| 7,788,468 B1 * | 8/2010 | Nickolls | G06F 9/3834 712/22 |
| 2014/0019717 A1 * | 1/2014 | Yamashita | G06F 9/3842 712/42 |

(Continued)

*Primary Examiner* — Charles M Swift
(74) *Attorney, Agent, or Firm* — Squire Patton Boggs LLP; Sarah Mirza

(57) ABSTRACT

Various embodiments include a parallel processing computer system that enables parallel instances of a program to synchronize at disparate addresses in memory. When the parallel program instances need to exchange data, the program instances synchronize based on a mask that identifies the program instances that are synchronizing. As each program instance reaches the point of synchronization, the program instance blocks and waits for all other program instances to reach the point of synchronization. When all program instances have reached the point of synchronization, at least one program instance executes a synchronous operation to exchange data. The program instances then continue execution at respective and disparate return addresses.

20 Claims, 7 Drawing Sheets

(51) Int. Cl.
*G06F 9/38* (2018.01)
*G06F 9/48* (2006.01)
*G06F 9/50* (2006.01)

(56) References Cited

U.S. PATENT DOCUMENTS

| | | | |
|---|---|---|---|
| 2014/0122934 A1* | 5/2014 | Wang | G06F 11/36 |
| | | | 712/225 |
| 2016/0283245 A1* | 9/2016 | Ben-Kiki | G06F 12/0895 |
| 2018/0314520 A1* | 11/2018 | Tirumala | G06F 9/46 |
| 2018/0373512 A1* | 12/2018 | Li | G06F 9/522 |
| 2020/0081748 A1* | 3/2020 | Johnson | G06F 9/3836 |
| 2021/0294673 A1* | 9/2021 | Edwards | G06F 9/3009 |

* cited by examiner

TECHNIQUES FOR EFFICIENTLY SYNCHRONIZING MULTIPLE PROGRAM THREADS

BACKGROUND

Field of the Various Embodiments

Various embodiments relate generally to parallel processing compute architectures and, more specifically, to techniques for efficiently synchronizing multiple program threads.

DESCRIPTION OF THE RELATED ART

Computer systems generally include, among other things, one or more processing units, such as central processing units (CPUs) and/or graphics processing units (CPUs), and one or more memory subsystems. Typically, GPUs include multiple processing engines that execute program instructions in parallel, for improved performance relative to a single processing engine. Each of the multiple processing engines executes "threads," where a thread refers to an instance of a particular program executing on a particular set of input data. Single-instruction, multiple-thread (SIMT) techniques are used to support parallel execution of a large number of generally synchronized threads, referred to herein as a "set of threads" or, more simply, a "warp," using a common instruction unit configured to issue instructions to the set of processing engines within the GPU. Rather than having all processing engines execute identical instructions, SIMT execution allows different threads to more readily follow divergent execution paths through a given program. Because threads performing SIMT execution are allowed to diverge, the threads may complete execution at different times.

In many applications, the threads execute instructions concurrently to complete a first phase of a program and, when all threads have completed the first phase, proceed with executing instructions concurrently to complete a second phase of the program. In order to determine that all threads have completed the first phase, each thread executes a synchronizing instruction at the end of the instructions in the first phase. As each thread reaches the synchronizing instruction, the thread suspends execution, or "blocks," until all threads have completed the first phase. When the final thread executes the synchronizing instruction, the threads unblock and begin execution of the instructions in the second phase.

One drawback with this approach for synchronizing thread execution is that all threads are constrained to synchronize at the same synchronization instruction at a particular address in memory. However, with certain applications, a first subset of threads in a warp executes a first set of instructions while a second subset of threads in the warp executes a second set of instructions. If each of the first set of instructions and the second set of instructions include respective synchronizing instructions, those two synchronizing instructions would be at different addresses in memory. As a result, the first subset of threads would not be able to reliably synchronize with the second subset of threads.

One technique for addressing this drawback is to include a synchronization outline function in the program instructions, where the synchronization outline function includes the synchronizing instruction. At the desired point of synchronization, the first set of instructions includes an instruction to call the synchronization outline function. The first subset of threads then blocks at the synchronizing instruction included in the synchronization outline function. Similarly, at the desired point of synchronization, the second set of instructions includes an instruction to call the synchronization outline function. The second subset of threads then blocks at the synchronizing instruction included in the synchronization outline function. Once all threads in the first subset and the second subset reach the synchronizing instruction, the threads unblock. Post synchronization, the threads in the first subset return to the first set of instructions, while the threads in the second subset return to the second set of instructions. However, specifying this synchronization outline function in the program code increases the complexity and involves additional program instructions that may be cumbersome for the programmer to include in the program. Further, calling the synchronization outline function, executing the function, and then returning from the function takes additional processing time, thereby reducing overall performance.

As the foregoing illustrates, what is needed in the art are more efficient techniques for synchronizing threads in computer systems with parallel processing compute architectures.

SUMMARY

Various embodiments of the present disclosure set forth a computer-implemented method for synchronizing a set of threads at disparate addresses. The method includes determining that a first thread included in the set of threads has blocked when executing a first synchronizing instruction located at a first address. The method further includes determining that a second thread included in the set of threads has blocked when executing a second synchronizing instruction located at a second address. The method further includes unblocking the first thread and the second thread. The method further includes returning the first thread to the first address. The method further includes returning the second thread to the second address.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques, different subsets of threads in a warp synchronize via multiple copies of a synchronizing instruction located at different addresses in memory. Therefore, threads in a warp are able to synchronize with each other when executing different sets of instructions without the need for a synchronization outline function or similar mechanism. As a result, threads synchronous more efficiently with less overhead and with improved processor performance relative to prior approaches. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings

DETAILED DESCRIPTION

In the following description, numerous specific details are set forth to provide a more thorough understanding of the various embodiments. However, it will be apparent to one skilled in the art that the inventive concepts may be practiced without one or more of these specific details.

As described herein, a parallel processing compute architecture includes processing engines configured to synchronize threads at disparate addresses. Threads in a given warp are divided into at least a first subset of threads and a second subset of threads. The threads in the first subset execute a first set of instructions, while the threads in the second subset execute a second set of instructions. At the point of synchronization, the threads in the first subset execute a first synchronizing instruction at a first address in memory. The first synchronizing instruction includes a first mask that identifies the threads participating in a synchronous operation. Similarly, at the point of synchronization, the threads in the second subset execute a second synchronizing instruction at a second address in memory. The second synchronizing instruction includes a second mask that identifies the threads the threads participating in the synchronous operation.

As each thread in the two subsets of threads executes the respective synchronizing instruction, the thread blocks and waits for the remaining threads to reach the point of synchronization. When the final participating thread reaches the point of synchronization and executes the synchronizing instruction, the synchronizing instruction resolves, threads in the first subset and the second subset unblock, and the subsequent instructions are executed in a warp synchronous fashion. At least one thread executes the synchronous operation. Each thread in the first subset returns to the first set of instructions to continue execution at the instruction after the first synchronizing instruction or, optionally, at a later instruction specified by an immediate offset. Likewise, each thread in the second subset returns to the first set of instructions to continue execution at the instruction after the second synchronizing instruction or, optionally, at a later instruction as specified by an immediate offset. In this manner, the threads in the first subset synchronize at a different address in memory than the threads in the second subset.

System Overview

Figure 1:
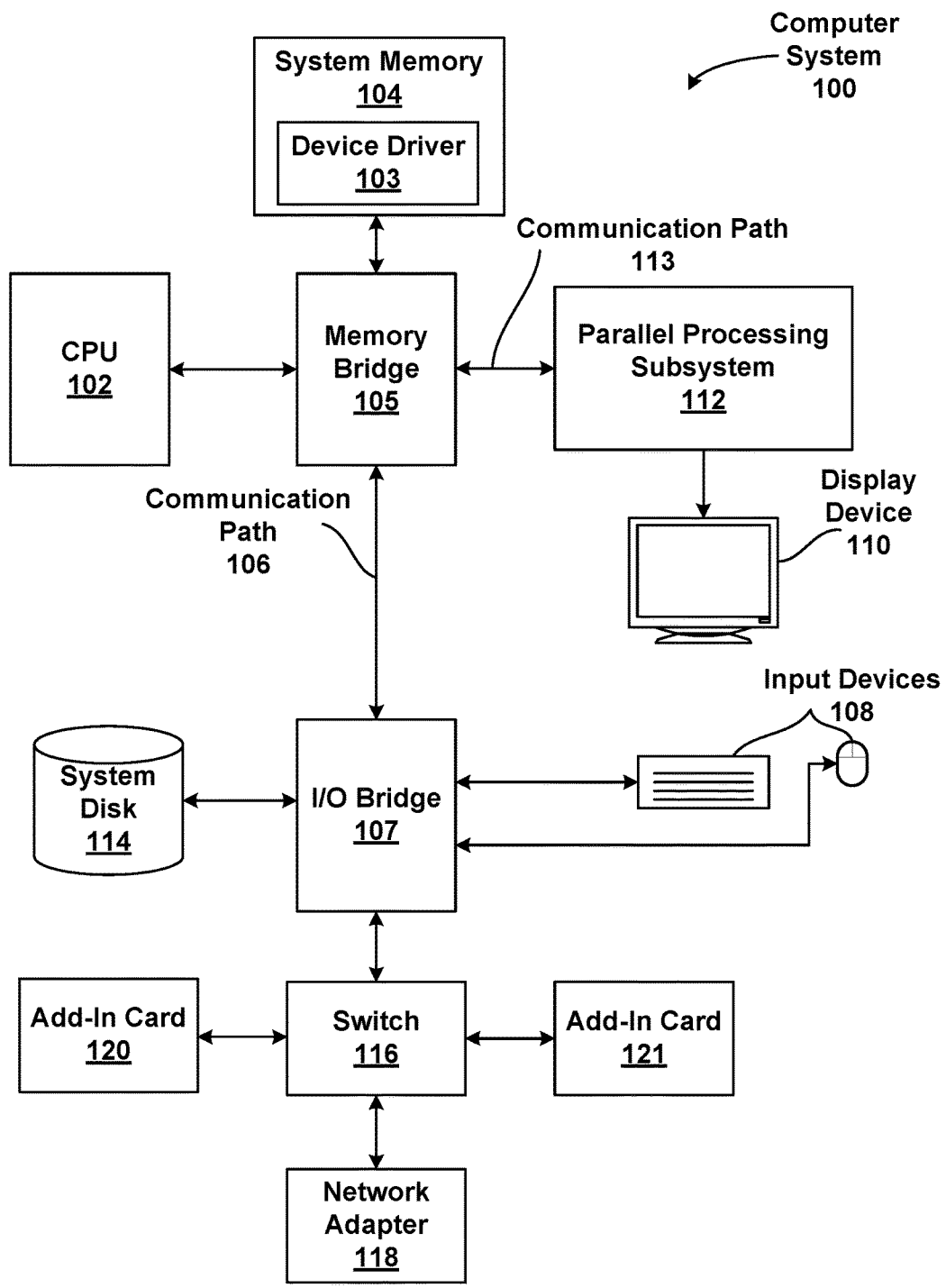
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
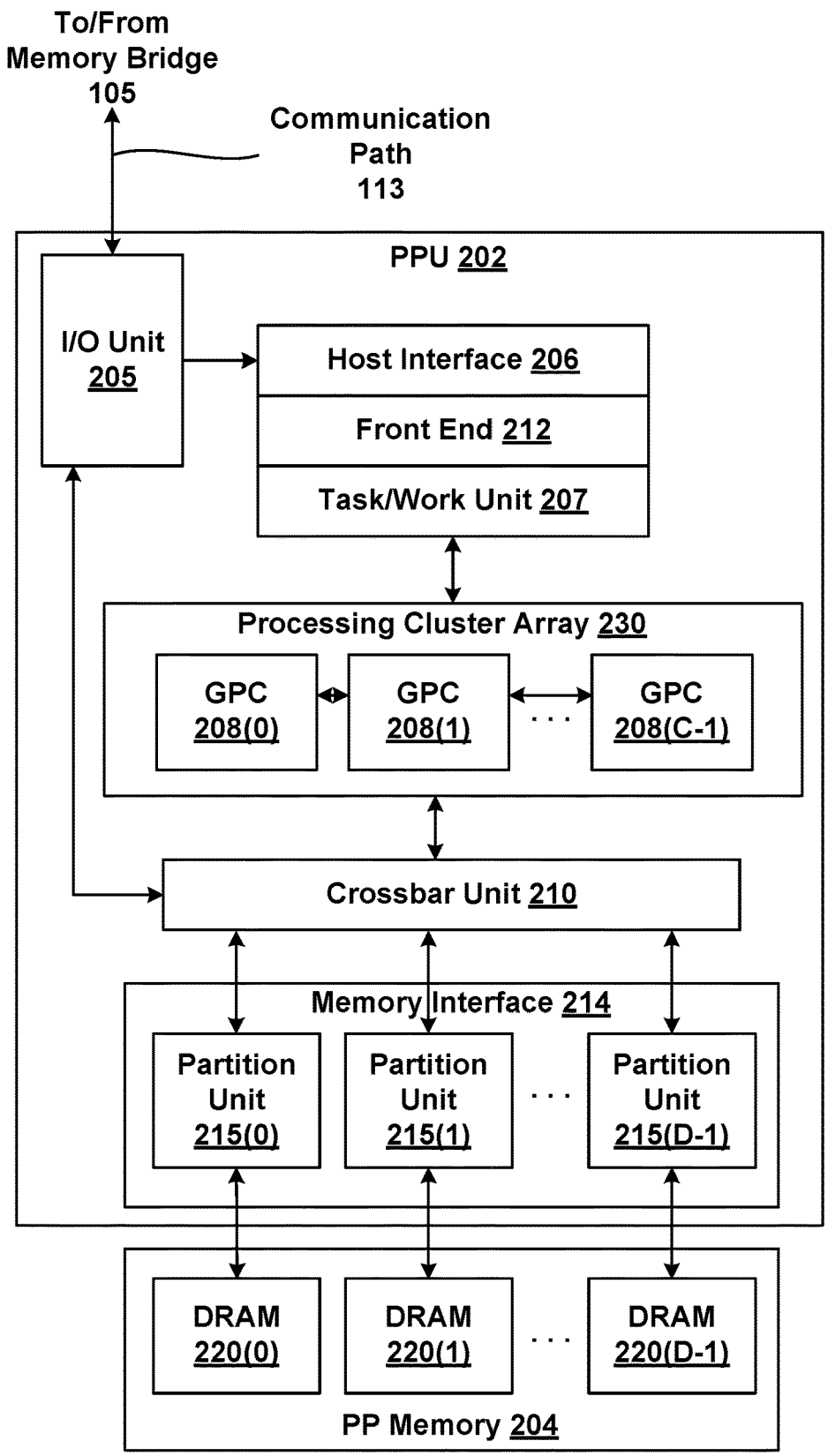
FIG. 2 is a block diagram of a parallel processing unit (PPU) included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D 1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
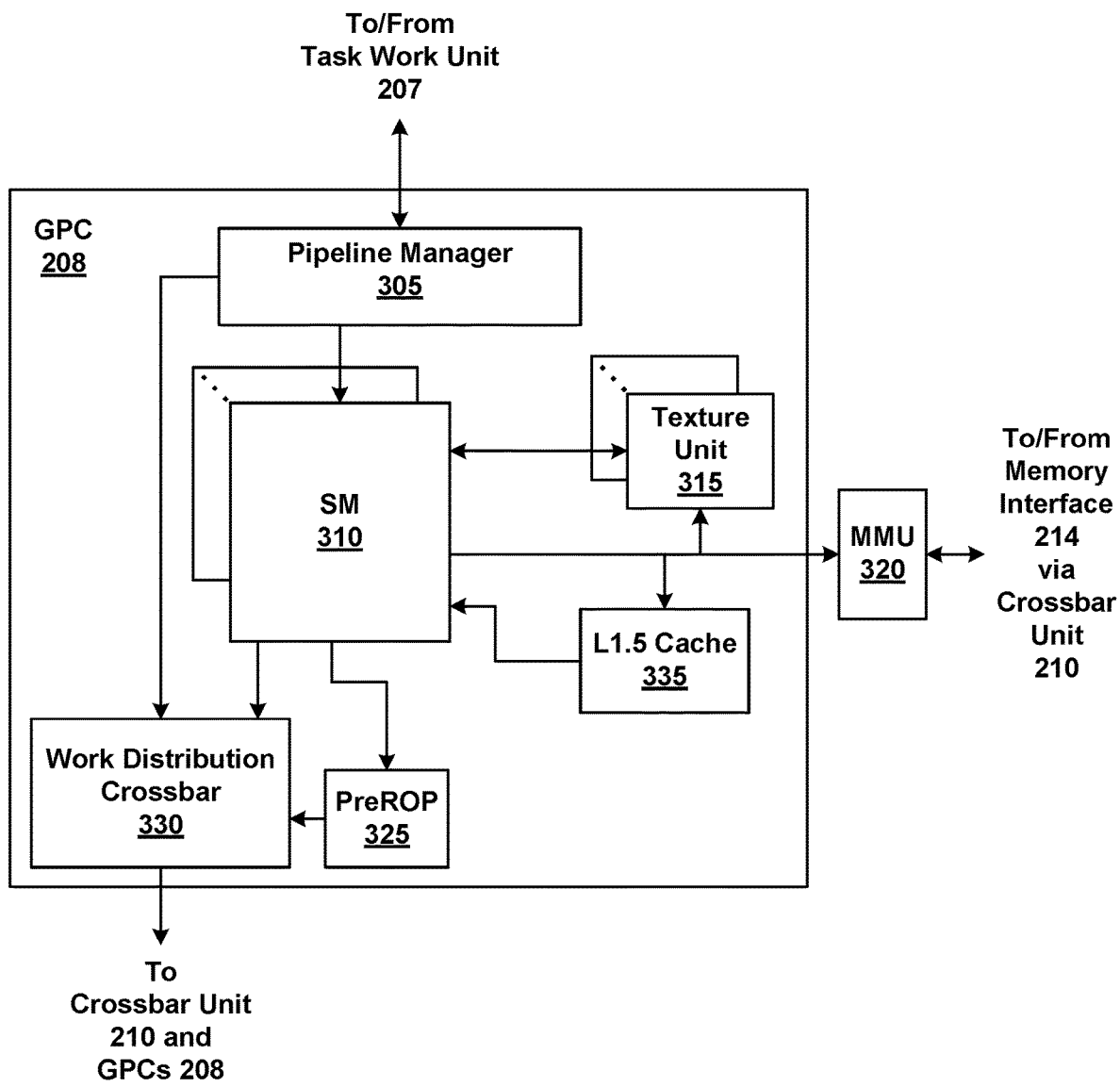
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M 1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Synchronizing Subsets of Threads at Disparate Addresses

As discussed herein, the disclosed techniques allow divergent threads in a warp to synchronize at disparate addresses. One traditional technique for synchronizing divergent threads is shown in the section of pseudocode presented in Table 1 below:

TABLE 1

Traditional Approach for Warp Synchronization

```
1010   if (even_threads) {
1020      // Even threads specific program instructions -- part-1
1030      // All threads need to exchange data
1040      LEPC // Load effective program counter, save off the return address
1050      CALL sync_outline ( )
1060      // Even threads specific program instructions -- part-2
1070   }
1080   else {
1090      // Odd threads specific program instructions -- part-1
1100      // All threads need to exchange data
1110      LEPC // Load effective program counter, save off the return address
1120      CALL sync_outline ( )
1130      // Odd threads specific program instructions -- part-2
1140   }
1150   sync_outline ( ) {
1160      WARPSYNC 0xFFFFFFFF // Warp sync operation specifying the mask of
       all participating threads
1170      // Synchronous operation, such as SHFL, VOTE, and/or the like
1180      RET // back to the main function - Different return addresses for even and
       odd threads
1190   }
```

As shown, the pseudocode includes a conditional if-then-else statement where the threads take divergent paths. In particular, the even numbered threads, referred to herein as the even threads, take a first path, illustrated in lines 1010-1070, and the odd numbered threads, referred to herein as the even threads, take a second path, illustrated in lines

1080-1140. The even number threads execute program instructions that are specific to the even threads (line 1020) and then reach a point where all of the threads in the warp need to execute a synchronous operation in order to exchange data (line 1030). Similarly, the odd number threads execute program instructions that are specific to the odd threads (line 1090) and then reach a point where all of the threads in the warp need to execute a synchronous operation in order to exchange data (line 1110). One such synchronous operation includes a warp shuffle (SHFL) instruction. The warp shuffle instruction allows threads to exchange data with one another by allowing each thread to read registers belonging to one or more other threads in the warp. Another such synchronous operation includes a vote (VOTE) instruction. The vote instruction allows a thread in the warp to compare a condition across multiple threads in the warp and to broadcast the results of the comparison to other threads in the warp. In systems where all threads in a warp are constrained to synchronize at a single address, the programmer is not able to include two synchronizing instructions, because the two synchronizing instructions would be in different paths and would, therefore, have different addresses in memory. Therefore, the programmer would not be able to synchronize threads in two paths by including one synchronizing instruction in the first path and including another synchronizing instruction in the second path.

As a result, the threads in the first path and the threads in the second path call a common synchronization outline function, illustrated in lines 1150-1190. The even threads in the first path execute a load effective program counter (LEPC) instruction (line 1040) in order to save the return address for the even threads. This return address identifies the first instruction for the even threads to execute when the even threads return from the synchronization outline function. The even threads in the first path execute a call to the synchronization outline function (line 1050). Similarly, the odd threads in the second path execute a load effective program counter (LEPC) instruction (line 1110) in order to save the return address for the odd threads. This return address identifies the first instruction for the odd threads to execute when the odd threads return from the synchronization outline function. The odd threads in the second path execute a call to the synchronization outline function (line 1120).

As each thread in the warp begins executing the synchronization outline function (line 1150), the thread executes a warp synchronizing (WARPSYNC) instruction (line 1160). The WARPSYNC instruction specifies a mask that identifies the threads in the warp that are participating in the synchronous operation. The mask includes a bit for each of the threads in warp. For example, if a warp includes 32 threads, then the mask includes 32 bits, one bit for each thread. A value of 1 at a particular bit position in the mask indicates that the corresponding thread is participating in the synchronous operation. A value of 0 at a particular bit position in the mask indicates that the corresponding thread is not participating in the synchronization operation. As shown, the mask for WARPSYNC instruction of line 1160 is 0xFFFFFFFF, indicating that all 32 threads in the warp are participating in the synchronization operation. As each thread executes the WARPSYNC instruction, the thread blocks and waits for all other participating threads to reach and execute the WARPSYNC instruction.

When the final participating thread reaches the point of synchronization and executes the synchronizing instruction, the synchronizing instruction resolves. The participating threads unblock, and at least one participating thread executes a synchronous operation (line 1170). The synchronous operation may include a cross-thread instruction, such as a SHFL instruction or a VOTE instruction. Additionally or alternatively, the synchronous operation may include certain other instructions. Each thread returns to the corresponding return address saved by the LEPC instruction. The even threads execute a return (RET) instruction (line 1180) to return to an address in the first path and continue to execute program instructions that are specific to the even threads (line 1060). Similarly, the odd threads execute a return (RET) instruction (line 1180) to return to an address in the second path and continue to execute program instructions that are specific to the odd threads (line 1130).

In addition, with the approach shown in Table 1, certain compiler optimizations are not available. In particular, the compiler is unable to implement loop unrolling or inline functions for synchronous operations, such as the synchronization outline function shown in Table 1.

With loop unrolling, the compiler breaks a loop of program code that is iteratively executed into a single set of program code that is executed once. The single set of program code includes one instance of program code for each iteration of the program loop. For example, if the compiler detects a loop of program code, where the loop of program code is executed five times, then the compiler inserts five instances of the looped program code as a single set of program code, modifying each instance as needed in order to execute the program code correctly. Although the insertion of multiple instances of the loop code consumes more memory space than the original program loop, the compiler does not need to include the code that manages the number of iterations of the program loop. As a result, unrolled loops generally result in better performance than a program loop. However, if the loop of program code includes a synchronizing instruction, then the compiler inserts multiple instances of the synchronizing instruction in memory, such as five instances. Each instance of the synchronizing instruction is at a different location in memory. Therefore, the compiler cannot guarantee that all participating threads return to the same return address after the synchronous operation.

With inline functions, the compiler detects a function, such as the synchronization outline function, the compiler inserts the instructions included in the function in line with the program code that performs the call to the function. For example, the compiler would insert multiple instances of the instructions included in the synchronization outline function of lines 1150-1190 at the call instruction at line 1050 and the call instruction at line 1120. Although the insertion of multiple instances of the function consumes more memory space than the original program loop, the compiler does not need to include the call instruction that calls the function along with program code to return to the calling program code after the function executes. As a result, inline functions generally result in better performance than a separate function. However, if the function includes a synchronizing instruction, then the compiler inserts multiple instances of the synchronizing instruction in memory, such as two instances. Each instance of the synchronizing instruction is at a different location in memory. Therefore, the compiler cannot guarantee that all participating threads return to the same return address after the synchronous operation.

As a result, when the compiler detects a function that includes a synchronizing instruction, such as the synchronization outline function of Table 1, the compiler is generally unable to determine a priori whether loop unrolling and/or inline functions may be employed while still returning all participating threads to the same return address. Therefore, when the compiler detects a function that includes a synchronizing instruction, the compiler disables loop unrolling and inline functions for that function. As a result, the compiler is unable to achieve improved performance from loop unrolling and inline functions during synchronous operations.

This traditional approach illustrated in Table 1 consumes processing and memory overhead in the form of saving return addresses for each thread, calling a separate function, returning from that function, and restoring the previously saved return addresses.

The disclosed techniques allow divergent threads in a warp to synchronize at disparate addresses, thus reducing and/or eliminating processing and memory overhead relative to other approaches. Further, by allowing divergent threads to synchronize at disparate addresses, the compiler is able to take advantage of performance gains from loop unrolling and inline functions during synchronous operations. One such technique for synchronizing divergent threads at disparate addresses is shown in the section of pseudocode presented in Table 2 below:

TABLE 2

Warp Synchronization at Disparate Addresses

```
2010   if (even_threads) {
2020       // Even threads specific program instructions -- part-1
2030       // All threads need to exchange data
2040       WARPSYNC.COLLECTIVE Rb, #0x30;
2050       SHFL (...); // Needs to use the same pinned register for the collective operation
2060       IADD (...); // Needs to use the same pinned registers
2070       ENDCOLLECTIVE;
2080       // Even threads specific program instructions -- part-2
2090   }
2100   else {
2110       // Odd threads specific program instructions -- part-1
2120       // All threads need to exchange data
2130       WARPSYNC.COLLECTIVE Rb, #0x30;
2140       SHFL (...); // Needs to use the same pinned register for the collective operation
2150       IADD (...); // Needs to use the same pinned registers
2160       ENDCOLLECTIVE;
2170       // Odd threads specific program instructions -- part-2
2180   }
```

The approach shown in Table 2 employs a WARPSYNC.COLLECTIVE instruction with a register-based active mask (such as Rb) and an immediate offset (such as #0x30). This approach is in contrast to the common return address approach shown in Table 1. As shown in Table 2, the pseudocode includes a conditional if-then-else statement where the threads take divergent paths. In particular, the even threads take a first path, illustrated in lines 2010-2090, and the odd threads take a second path, illustrated in lines 2100-2180. The even threads and the odd threads may execute the respective paths in any order. The even number threads execute program instructions that are specific to the even threads (line 2020) and then reach a point where all of the threads in the warp need to execute a synchronous operation, also referred to herein as a collective operation, in order to exchange data (line 2030). Similarly, the odd number threads execute program instructions that are specific to the odd threads (line 2110) and then reach a point where all of the threads in the warp need to perform a synchronous operation in order to exchange data (line 2120).

The even threads execute a warp synchronizing collective (WARPSYNC.COLLECTIVE) instruction at a first address in memory corresponding to line 2040. Similarly, the odd threads execute a warp synchronizing collective (WARPSYNC.COLLECTIVE) instruction at a second address in memory corresponding to line 2130. The WARPSYNC.COLLECTIVE instruction includes an operand that specifies a register that stores the value of the mask that identifies the threads in the warp that are participating in the synchronous operation. As shown, the WARPSYNC.COLLECTIVE instruction specifies register Rb. If register Rb=0xFFFFFFFF, then all 32 threads are participating in the synchronous operation. If register Rb=0x0000FFFF, then the lowermost 16 threads are participating in the synchronous operation. If register Rb=0xFFFF0000, then the uppermost 16 threads are participating in the synchronous operation, and so on. The WARPSYNC.COLLECTIVE instruction further includes an operand that specifies an immediate offset to add to the return address for certain participating threads to generate an adjusted address, as further discussed herein. As shown, the WARPSYNC.COLLECTIVE instruction specifies an immediate offset of #0x30.

As each even thread executes the WARPSYNC.COLLECTIVE instruction at line 2040, the even thread blocks and enters the BLOCKED_COLLECTIVE state. The even thread blocks at the return address corresponding to the program counter associated with the WARPSYNC.COLLECTIVE instruction at line 2040. The processor compares the synchronizing mask, as specified by the value of register Rb, against all threads that are in the BLOCKED_COLLECTIVE state. If at least one participating thread is not the BLOCKED_COLLECTIVE state, then the even thread waits until all threads specified by the synchronizing mask have transitioned to the BLOCKED_COLLECTIVE state. As each odd thread executes the WARPSYNC.COLLECTIVE instruction at line 2130, the odd thread blocks and enters the BLOCKED_COLLECTIVE state. The odd thread blocks at the return address corresponding to the program counter associated with the WARPSYNC.COLLECTIVE instruction at line 2130. The processor compares the synchronizing mask against all threads that are in the BLOCKED_COLLECTIVE state. If at least one participating thread is not the BLOCKED_COLLECTIVE state, then the odd thread waits until all threads specified by the synchronizing mask have transitioned to the BLOCKED_COLLECTIVE state.

When the final participating thread has transition to the BLOCKED_COLLECTIVE state, the WARPSYNC.COLLECTIVE instruction resolves.

At least one thread, such as the final participating thread, executes the instructions between the WARPSYNC.COLLECTIVE instruction and the ENDCOLLECTIVE instruction at line 2160, referred to herein as an end instruction. These instructions between the WARPSYNC.COLLECTIVE instruction and the ENDCOLLECTIVE instruction are referred to herein as the "collective block" instructions. Typically, the collective block instructions are executed once, if at all. More specifically, the final thread resolves the synchronizing instruction, and the subsequent instructions are executed by all the participating threads specified by the synchronizing mask in a warp synchronous fashion. Because instruction predicates are allowed, there is a possibility that only a subset of the threads specified in the synchronizing mask execute the warp synchronous operations. The collective block instructions are executed with the active mask set to the value of register Rb, such as 0xFFFFFFFF, which is the mask identified by the WARPSYNC.COLLECTIVE instruction.

Even and odd threads execute the collective block instructions until the ENDCOLLECTIVE instruction. Execution of the ENDCOLLECTIVE instruction sets the collective mask to 0x0, indicating that the WARPSYNC.COLLECTIVE instruction has resolved, and the collective block instructions have executed. Following execution of the ENDCOLLECTIVE instruction, the active mask is changed back to the last set of threads that executed the synchronizing instruction, such as even threads or the odd threads, as the case may be. Once the instructions in the collective block have executed, the elected threads employ the offset in the WARPSYNC.COLLECTIVE instruction to generate an adjusted address in order to jump to the end of the collective block. In this manner, the instructions in the collective block are not executed multiple times. These elected threads are promoted to a READY_AT_NEXT state when the WARPSYNC.COLLECTIVE instruction resolves in order to identify threads that need to jump over the instructions in the collective block.

If an even thread resolves the synchronizing instruction, then the even threads execute the collective block instructions at lines 2050 and 2060 until the ENDCOLLECTIVE instruction at line 2070. The odd threads are teleported to execute the same collective block instructions at lines 2050 and 2060 until the ENDCOLLECTIVE instruction at line 2070. In this manner, all threads represented by the synchronizing mask execute the same instructions at the same program counter and execute the same ENDCOLLECTIVE instruction. Execution of the ENDCOLLECTIVE instruction sets the collective mask to 0x0, indicating that the WARPSYNC.COLLECTIVE instruction has resolved, and the collective block instructions have executed. Following execution of the ENDCOLLECTIVE instruction, the active mask is changed back to the even threads. The even threads execute the even thread instructions following the collective block instructions at line 2080. The odd threads teleport back and execute the odd thread instructions following the collective block instructions at line 2170.

If an odd thread resolves the synchronizing instruction, then the odd threads execute the collective block instructions at lines 2140 and 2150 until the ENDCOLLECTIVE instruction at line 2160. The even threads are teleported to execute the same collective block instructions at lines 2140 and 2150 until the ENDCOLLECTIVE instruction at line 2160. In this manner, all threads represented by the synchronizing mask execute the same instructions at the same program counter and execute the same ENDCOLLECTIVE instruction. Execution of the ENDCOLLECTIVE instruction sets the collective mask to 0x0, indicating that the WARPSYNC.COLLECTIVE instruction has resolved, and the collective block instructions have executed. Following execution of the ENDCOLLECTIVE instruction, the active mask is changed back to the odd threads. The odd threads execute the odd thread instructions following the collective block instructions at line 2170. The even threads teleport back and execute the odd thread instructions following the collective block instructions at line 2080.

The collective block instructions for the even threads at lines 2050 and 2060 are identical to the collective block instructions for the odd threads at lines 2140 and 2150. Further, the collective block instructions for the even threads at lines 2050 and 2060 access the same pinned registers as the collective block instructions for the odd threads at lines 2140 and 2150. As a result, the synchronous operation executes correctly whether a thread executes the collective block instructions at lines 2050 and 2060 or the collective block instructions at lines 2140 and 2150. In addition, the synchronous operation executes correctly when one or more threads teleport to a different instance of the collective block instructions. In this regard, an even thread may block at the WARPSYNC.COLLECTIVE instruction for the even threads at line 2040, teleport to execute the collective block instructions for the odd threads at lines 2140 and 2150, and teleport back to the correct instruction for the even threads. Similarly, an odd thread may block at the WARPSYNC.COLLECTIVE instruction for the odd threads at line 2130, teleport to execute the collective block instructions for the even threads at lines 2050 and 2060, and teleport back to the correct instruction for the odd threads.

The collective block instructions include a SHFL instruction (lines 2050 and 2140). Additionally or alternatively, the collective block instructions may include other synchronous operations, such as a VOTE instruction, and/or the like. Further, the collective block instructions include an integer add (IADD) instruction (lines 2060 and 2150). Additionally or alternatively, the collective block instructions may include other certain other instructions, such as, other arithmetic instructions, breakpoint/trap (BPT) instructions, branch to relative address (BRA) instructions, jump to absolute address (JMP) instructions, and/or the like.

When a WARPSYNC.COLLECTIVE instruction resolves, threads that are blocked at the WARPSYNC.COLLECTIVE instruction transition from the BLOCKED_COLLECTIVE state to the READY_AT_NEXT state. This transition from the BLOCKED_COLLECTIVE state to the READY_AT_NEXT state excludes the last set of threads that resolved the WARPSYNC.COLLECTIVE instruction. Threads that are in the READY_AT_NEXT state do not re-execute the collective block instructions. Instead, threads that are in the READY_AT_NEXT state skip the collective block instructions by adjusting the return address when re-elected. More specifically, the threads return to the WARPSYNC.COLLECTIVE instruction. The threads add the return address to the immediate offset from the WARPSYNC.COLLECTIVE instruction to generate an adjusted return address or, more simply, an adjusted address. The even threads add the return address pointing to line 2040 to the #0x30 immediate offset in line 2040, such that the adjusted return address identifies further instructions for execution by the even threads (line 2080). Similarly, the odd threads add the return address pointing to line 2130 to the

0x30 immediate offset in line 2130, such that the adjusted return address identifies further instructions for execution by the odd threads (line 2170).

Because the threads in the warp may return to disparate addresses, the compiler may implement loop unrolling and/or inline functions for loops and inline functions that include synchronizing instructions. The compiler may break a loop of program code that includes a synchronizing instruction into a single set of program code that is executed once. The single set of program code includes multiple instances of program code, where each instance represents a different iteration of the program loop. Additionally or alternatively, the compiler may insert multiple instances of a function that includes a synchronizing instruction, such that the instructions within the function are in line with the program code that calls the function. Each instruction that calls the function is replaced with an instance of the instructions within the function.

It will be appreciated that the system shown herein is illustrative and that variations and modifications are possible. The approach shown in Table 2 includes two paths corresponding to two subsets of participating threads, namely even threads and odd threads. More generally, the participating threads may be divided in any manner, based on the corresponding active masks for respective subsets of threads. Further, the participating threads may be divided into any number of subsets, such as two subsets, three subsets, four subsets, and/or the like.

In some embodiments, certain threads may execute a WARPSYNC.COLLECTIVE.ALL instruction. As described herein, threads that execute a WARPSYNC.COLLECTIVE instruction identify the participating threads based on a mask stored in the register specified by the WARPSYNC.COLLECTIVE instruction. The threads transition to a BLOCKED_COLLECTIVE state and wait for all other threads specified by the mask. By contrast, the WARPSYNC.COLLECTIVE.ALL instruction does not specify a register that stores a mask. Instead, the WARPSYNC.COLLECTIVE.ALL instruction implies that the entire warp is included in the mask by default. The threads transition to a BLOCKED_ALL state and wait for all other threads in the entire warp to reach a synchronizing instruction and block. Similar to the WARPSYNC.COLLECTIVE instruction, the WARPSYNC.COLLECTIVE.ALL instruction includes an immediate offset that specifies a value to add to the return address for certain participating threads.

Figure 4:
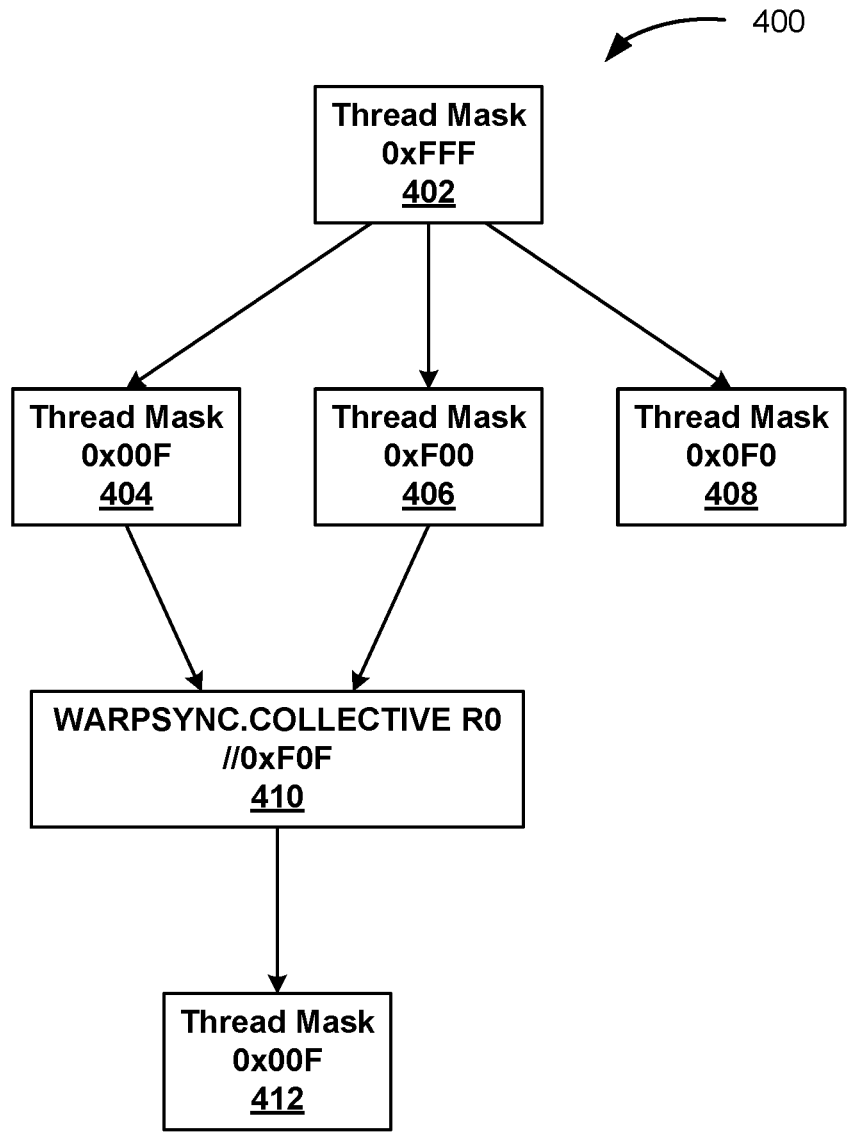
FIG. 4 is an execution flow of threads that synchronize at disparate addresses, according to various embodiments.

FIG. 4 is an execution flow 400 of threads that synchronize at disparate addresses, according to various embodiments. As shown, the execution flow 400 begins at block 402 with an active mask of 0xFFF, indicating that threads 0-11 of the warp are executing. The execution flow 400 splits into three subsets of threads at blocks 404, 406, and 408. The subset of threads at block 404 have an active mask of 0x00F indicating that threads 0-3 of the warp are executing as the first subset of threads. The subset of threads at block 406 have an active mask of 0xF00 indicating that threads 8-11 of the warp are executing as the second subset of threads. The subset of threads at block 408 have an active mask of 0x0F0 indicating that threads 4-7 of the warp are executing as the third subset of threads.

At some point during execution of the first subset and the second subset, the threads of the first subset and the second subset perform a synchronous operation. At block 410, the threads of the first subset and the second subset execute a WARPSYNC.COLLECTIVE instruction that specifies register R0 as the register that stores the active mask for the WARPSYNC.COLLECTIVE instruction. Register R0 stores the value 0xF0F, indicating that threads 0-3 and threads 8-11 are participating in the synchronous operation. After the WARPSYNC.COLLECTIVE instruction resolves, at least one thread executes the synchronous operation. At block 412, threads 0-3 of the first subset continue execution. The subset of threads at block 412 have an active mask of 0x00F indicating that threads 0-3 of the warp continue to execute as the first subset of threads. In this manner, various subsets of threads perform synchronous operations at disparate addresses via one or more WARPSYNC.COLLECTIVE instructions.

Figure 5:
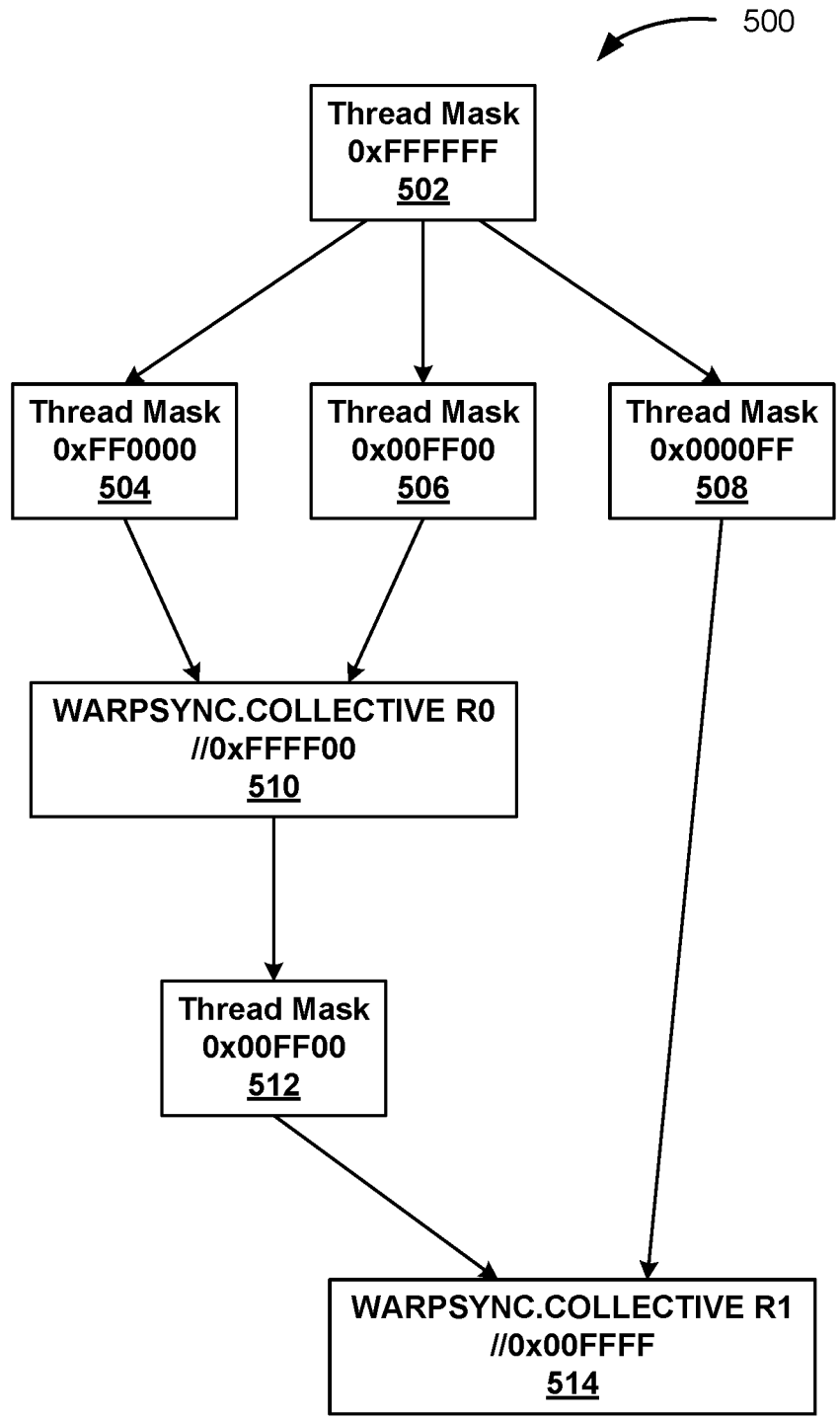
FIG. 5 is an execution flow of threads that are subject to aliasing and premature resolution of synchronous operations, according to various embodiments.

FIG. 5 is an execution flow 500 of threads that are subject to aliasing and premature resolution of synchronous operations, according to various embodiments. As shown, the execution flow 500 begins at block 502 with an active mask of 0xFFFFFF, indicating that threads 0-23 of the warp are executing. The execution flow 500 splits into three subsets of threads at blocks 504, 506, and 508. The subset of threads at block 504 have an active mask of 0xFF0000 indicating that threads 16-23 of the warp are executing as the first subset of threads. The subset of threads at block 506 have an active mask of 0x00FF00 indicating that threads 8-15 of the warp are executing as the second subset of threads. The subset of threads at block 508 have an active mask of 0x0000FF indicating that threads 0-7 of the warp are executing as the third subset of threads.

The threads of the first subset and the second subset perform a synchronous operation at block 510. At some point during the execution of the synchronous operation, the second subset executes the WARPSYNC.COLLECTIVE instruction that specifies the collective mask R0 as 0xFFFF00 indicating that threads 8-23 are participating in the synchronous operation. As each thread of the second subset executes the WARPSYNC.COLLECTIVE instruction at block 510, the thread transitions to the BLOCKED_COLLECTIVE state.

The threads of the second subset and the third subset all perform a synchronous operation at block 514. At some point during the execution of the synchronous operation, the third subset executes the WARPSYNC.COLLECTIVE instruction that specifies the collective mask R1 as 0xFFFF.

If the threads participating in the WARPSYNC.COLLECTIVE instruction at block 510 have stored the value 0x00FFFF in register R1, then the WARPSYNC.COLLECTIVE instruction at block 514 may incorrectly determine that the WARPSYNC.COLLECTIVE instruction at block 514 has resolved. As a result, the WARPSYNC.COLLECTIVE instruction at block 514 may resolve prematurely, resulting in a program execution error. To resolve this potential premature resolution of a WARPSYNC.COLLECTIVE instruction, the recommended practive is to use the same register for all WARPSYNC instructions across the entire program.

Figure 6:
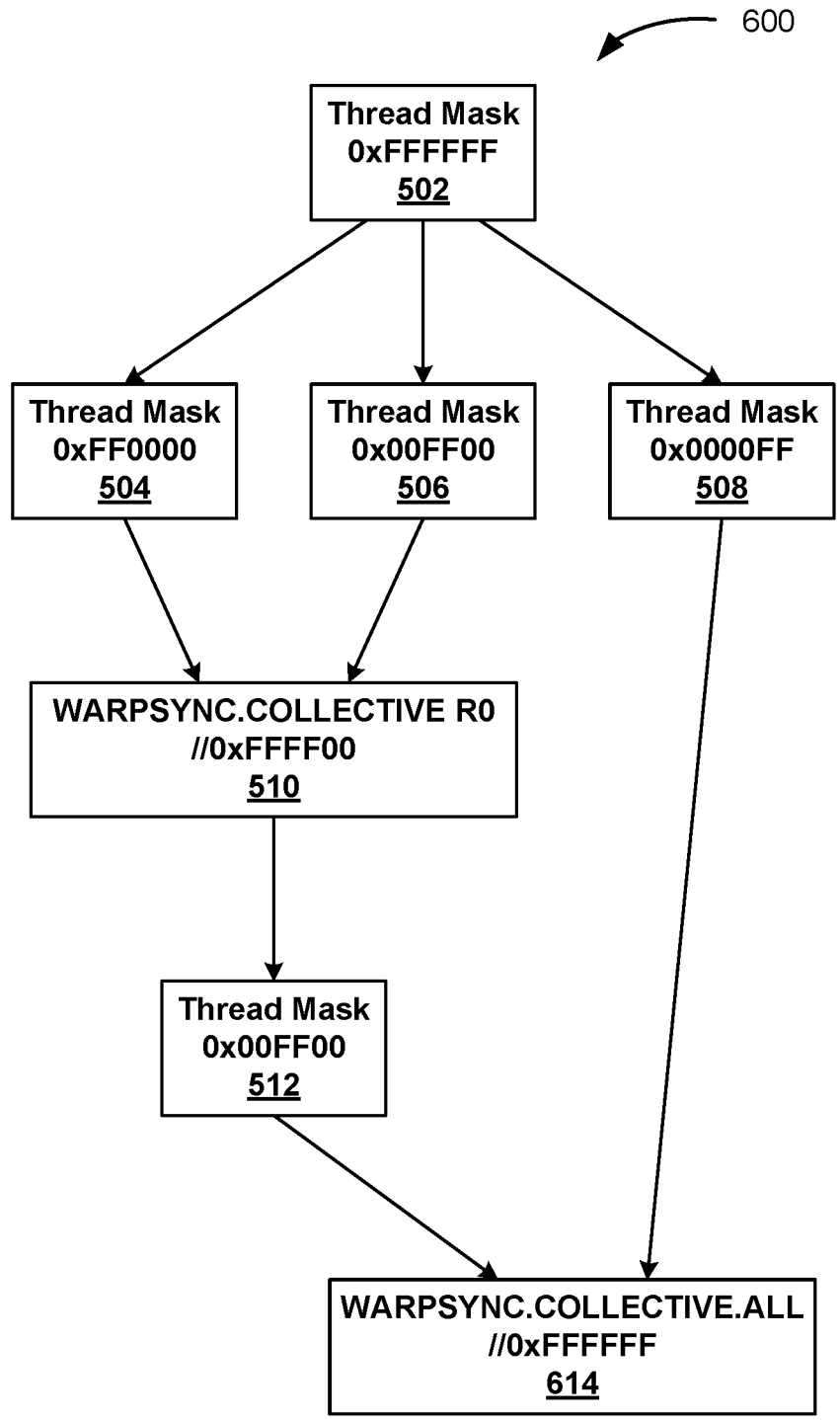
FIG. 6 is an execution flow of threads that prevents aliasing and premature resolution of synchronous operations, according to various embodiments.

FIG. 6 is an execution flow 600 of threads that prevents aliasing and premature resolution of synchronous operations, according to various embodiments. Blocks 502, 504, 506, 508, 510, and 512 function substantially as described in conjunction with FIG. 5 except as further described below.

At some point during execution of the second subset and the third subset, the threads of the second subset and the third subset perform a synchronous operation. At block 614, the threads of the second subset and the third subset execute a WARPSYNC.COLLECTIVE.ALL instruction. As each thread of the second subset and the third subset executes the WARPSYNC.COLLECTIVE.ALL instruction at block 614, the thread transitions to the BLOCKED_ALL state. The WARPSYNC.COLLECTIVE.ALL instruction at block 614 does not resolve until all threads execute the WARPSYNC.COLLECTIVE.ALL instruction and transition to the BLOCKED_ALL state, regardless of the content of any particular register. In this manner, the threads participating in the WARPSYNC.COLLECTIVE instruction of block 510 do not cause the WARPSYNC.COLLECTIVE.ALL instruction at block 614 to resolve prematurely.

Figure 7:
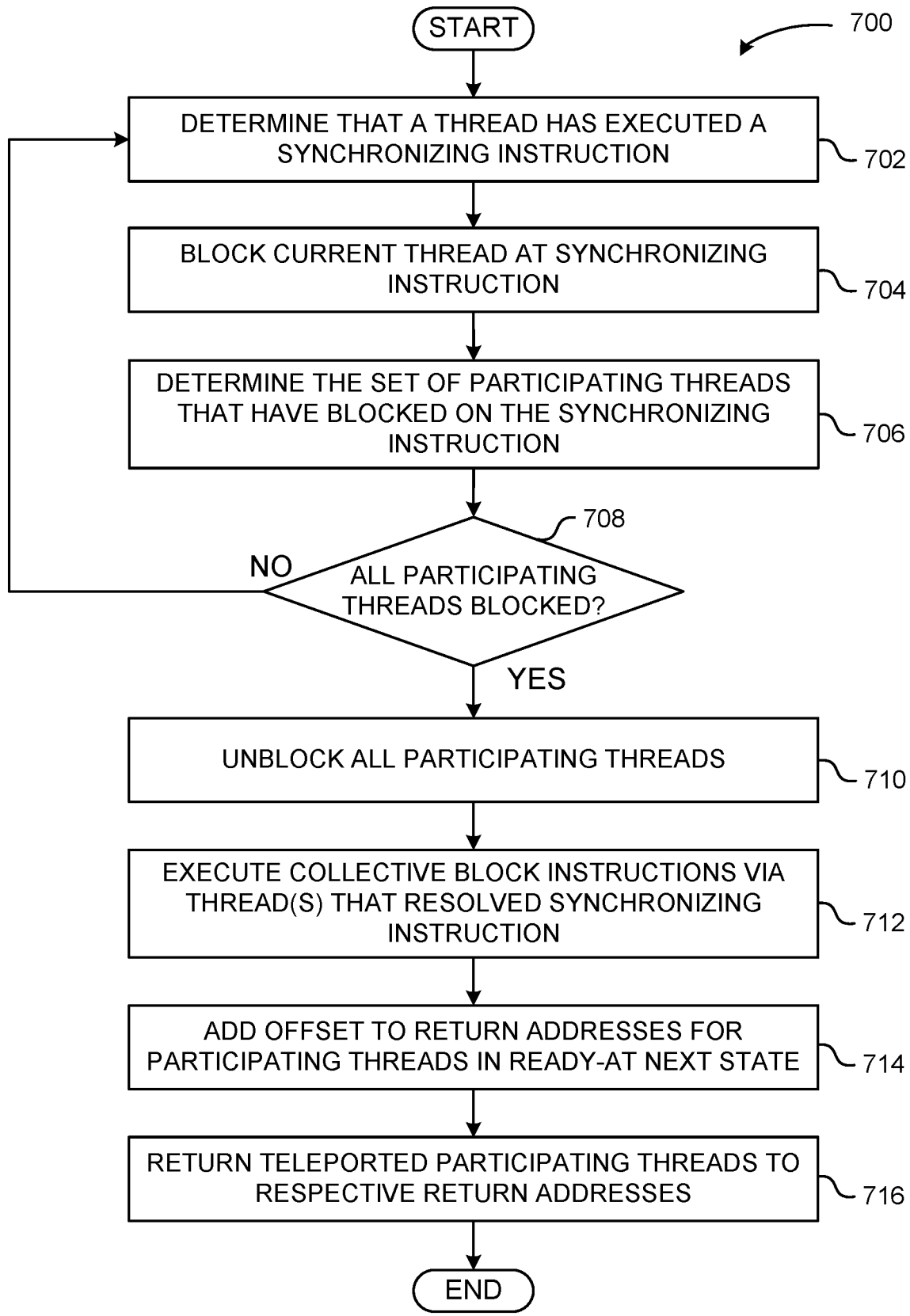
FIG. 7 is a flow diagram of method steps for synchronizing threads at disparate addresses in the PPU of FIG. 2, according to various embodiments.

FIG. 7 is a flow diagram of method steps for synchronizing threads at disparate addresses, according to various embodiments. Although the method steps are described in conjunction with the systems of FIGS. 1-6, persons of ordinary skill in the art will understand that any system configured to perform the method steps, in any order, is within the scope of the present disclosure.

As shown, a method 700 begins at step 702, where a processor, such as the CPU 102, PPU 202, GPC 208, or SM 310 of FIGS. 1-3, determines that a thread has executed a synchronizing instruction. The synchronizing instruction may be a WARPSYNC.COLLECTIVE instruction that includes an operand that specifies a register that stores the value of the mask that identifies the threads in the warp that are participating in the synchronous operation. After executing the WARPSYNC.COLLECTIVE instruction, the thread transitions to the BLOCKED_COLLECTIVE state. Additionally or alternatively, the synchronizing instruction may be a WARPSYNC.COLLECTIVE.ALL instruction that does not specify a register that stores a mask. Instead, with the WARPSYNC.COLLECTIVE.ALL instruction, all threads transition in the entire warp are presumed to be participating. After executing the WARPSYNC.COLLECTIVE.ALL instruction, the thread transitions to the BLOCKED_ALL state. Both the WARPSYNC.COLLECTIVE instruction and the WARPSYNC.COLLECTIVE.ALL instruction further include an operand that specifies an immediate offset to add to the return address for certain participating threads.

At step 704, the processor blocks the current thread at the synchronizing instruction. In the case of a WARPSYNC.COLLECTIVE instruction, the processor transitions the thread to the BLOCKED_COLLECTIVE state. In the case of a WARPSYNC.COLLECTIVE.ALL instruction, the processor transitions the thread to the BLOCKED_ALL state. At step 706, the processor determines the set of participating threads that have blocked on the synchronizing instruction. In the case of a WARPSYNC.COLLECTIVE instruction, the processor determines which threads, as identified by the mask stored in the identified register, have transitioned to the BLOCKED_COLLECTIVE state. In the case of a WARPSYNC.COLLECTIVE.ALL instruction, the processor determines which threads in the warp have transitioned to the BLOCKED_ALL state.

At step 708, the processor determines whether all participating threads have blocked. If one or more participating threads have not blocked, then the proceeds to step 702, described above, to process additional participating threads that have not blocked. If all participating threads have blocked, then the method 700 proceeds to step 710, where the processor unblocks all participating threads. The final participating threads that resolves the WARPSYNC.COLLECTIVE instruction executes the collective block instructions. The processor transitions the remaining participating threads to the READY_AT_NEXT state. At step 712, the processor executes the collective block instructions via the threads that resolved the WARPSYNC.COLLECTIVE instruction. The collective block instructions include a synchronous operation, such as a SHFL instruction, a VOTE instruction, and/or the like. The collective block instructions may further include certain other instructions, such as, arithmetic instructions, breakpoint/trap instructions, branch to relative address instructions, jump to absolute address instructions, and/or the like.

At step 714, the processor adds an offset to the return address for all participating threads that are in the READY_AT_NEXT state. The offset is specified by a synchronizing instruction, such as the WARPSYNC.COLLECTIVE instruction or WARPSYNC.COLLECTIVE.ALL instruction of step 702. At step 716, the processor returns the teleported participating threads to respective return addresses, as adjusted at step 714. The return addresses for the participating threads may differ from one another. In this manner, the participating threads may synchronize at disparate addresses. The method 700 then terminates.

In sum, various embodiments include a parallel processing compute architecture that includes processing engines configured to synchronize threads at disparate addresses. Threads in a given warp are divided into at least a first subset of threads and a second subset of threads. The threads in the first subset execute a first set of instructions, while the threads in the second subset execute a second set of instructions. At the point of synchronization, the threads in the first subset execute a first synchronizing instruction at a first address in memory. The first synchronizing instruction includes a first mask that identifies the threads participating in a synchronous operation. Similarly, at the point of synchronization, the threads in the second subset execute a second synchronizing instruction at a second address in memory. The second synchronizing instruction includes a second mask that identifies the threads the threads participating in the synchronous operation.

As each thread in the two subsets of threads executes the respective synchronizing instruction, the thread blocks and waits for the remaining threads to reach the point of synchronization. When the final participating thread reaches the point of synchronization and executes the synchronizing instruction, the synchronizing instruction resolves, threads in the first subset and the second subset unblock, and the subsequent instructions are executed in a warp synchronous fashion. At least one thread executes the synchronous operation. Each thread in the first subset returns to the first set of instructions to continue execution at the instruction after the first synchronizing instruction or, optionally, at a later instruction specified by an immediate offset. Likewise, each thread in the second subset returns to the first set of instructions to continue execution at the instruction after the second synchronizing instruction or, optionally, at a later instruction as specified by an immediate offset. In this manner, the threads in the first subset synchronize at a different address in memory than the threads in the second subset.

At least one technical advantage of the disclosed techniques relative to the prior art is that, with the disclosed techniques, different subsets of threads in a warp synchronize via multiple copies of a synchronizing instruction located at different addresses in memory. Therefore, threads in a warp are able to synchronize with each other when executing different sets of instructions without the need for a synchronization outline function or similar mechanism. As a result, threads synchronous more efficiently with less overhead and with improved processor performance relative to prior approaches. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for synchronizing a set of threads at disparate addresses, the method comprising:
    determining that a first thread included in the set of threads has blocked when executing a first synchronizing instruction located at a first address in a program instruction memory;
    determining that a second thread included in the set of threads has blocked when executing a second synchronizing instruction located at a second address in the program instruction memory, wherein the second address is different from the first address;
    unblocking the first thread and the second thread;
    returning the first thread to the first address to synchronously execute a first instruction included in a first set of instructions subsequent to the first synchronizing instruction; and
    returning the second thread to the second address to synchronously execute a second instruction included in a second set of instructions subsequent to the second synchronizing instruction.

2. The computer-implemented method of claim 1, further comprising executing, via at least one of the first thread nor the second thread, a synchronous operation that includes the first instruction that exchanges data between the first thread and the second thread.

3. The computer-implemented method of claim 2, wherein the synchronous operation includes the second instruction that comprises an arithmetic instruction, a breakpoint/trap instruction, a branch to relative address instruction, or a jump to absolute address instruction.

4. The computer-implemented method of claim 3, wherein the first instruction and the second instruction are located between the first synchronizing instruction and an end instruction that terminates the synchronous operation.

5. The computer-implemented method of claim 2, wherein the synchronous operation includes a program loop that includes the first instruction, and further comprising:
    executing a first instance of a portion of the program loop that includes a first instance of the first synchronizing instruction at the first address; and
    executing a second instance of the portion of the program loop that includes a second instance of the first synchronizing instruction at a third address.

6. The computer-implemented method of claim 2, wherein the synchronous operation includes a function that includes the first instruction, and further comprising:

executing a first instance of a portion of the function that includes a first instance of the first synchronizing instruction at the first address; and executing a second instance of the portion of the function that includes a second instance of the first synchronizing instruction at a third address.

7. The computer-implemented method of claim 1, further comprising:

adding a first offset associated with the first synchronizing instruction to the first address to generate a first adjusted address;

adding a second offset associated with the second synchronizing instruction to the second address to generate a second adjusted address;

executing, via the first thread, the first instruction located at the first adjusted address; and executing, via the second thread, the second instruction located at the second adjusted address.

8. The computer-implemented method of claim 1, further comprising:

identifying a subset of threads included in the set of threads, wherein the subset of threads includes the first thread and the second thread; and determining that all other threads included in the subset of threads have executed the first synchronizing instruction or the second synchronizing instruction.

9. The computer-implemented method of claim 8, wherein the subset of threads is identified via a mask stored in a register specified by at least one of the first synchronizing instruction or the second synchronizing instruction.

10. The computer-implemented method of claim 1, wherein:

the first synchronizing instruction specifies a subset of threads included in the set of threads, and the second synchronizing instruction specifies all threads included in the set of threads.

11. One or more non-transitory computer-readable media storing program instructions that, when executed by one or more processors, cause the one or more processors to perform steps of:

determining that a first thread included in a set of threads has blocked when executing a first synchronizing instruction located at a first address in a program instruction memory;

determining that a second thread included in the set of threads has blocked when executing a second synchronizing instruction located at a second address in the program instruction memory, wherein the second address is different from the first address;

unblocking the first thread and the second thread;

returning the first thread to the first address to synchronously execute a first instruction included in a first set of instructions subsequent to the first synchronizing instruction; and returning the second thread to the second address to synchronously execute a second instruction included in a second set of instructions subsequent to the second synchronizing instruction.

12. The one or more non-transitory computer-readable media of claim 11, further comprising executing, via at least one of the first thread nor the second thread, a synchronous operation that includes the first instruction that exchanges data between the first thread and the second thread.

13. The one or more non-transitory computer-readable media of claim 12, wherein the synchronous operation includes the second instruction that comprises an arithmetic instruction, a breakpoint/trap instruction, a branch to relative address instruction, or a jump to absolute address instruction.

14. The one or more non-transitory computer-readable media of claim 13, wherein the first instruction and the second instruction are located between the first synchronizing instruction and an end instruction that terminates the synchronous operation.

15. The one or more non-transitory computer-readable media of claim 12, wherein the synchronous operation includes a program loop that includes the first instruction, and further comprising:

executing a first instance of a portion of the program loop that includes a first instance of the first synchronizing instruction at the first address; and executing a second instance of the portion of the program loop that includes a second instance of the first synchronizing instruction at a third address.

16. The one or more non-transitory computer-readable media of claim 12, wherein the synchronous operation includes a function that includes the first instruction, and further comprising:

executing a first instance of a portion of the function that includes a first instance of the first synchronizing instruction at the first address; and executing a second instance of the portion of the function that includes a second instance of the first synchronizing instruction at a third address.

17. The one or more non-transitory computer-readable media of claim 11, further comprising:

adding a first offset associated with the first synchronizing instruction to the first address to generate a first adjusted address;

adding a second offset associated with the second synchronizing instruction to the second address to generate a second adjusted address;

executing, via the first thread, the first instruction located at the first adjusted address; and executing, via the second thread, the second instruction located at the second adjusted address.

18. The one or more non-transitory computer-readable media of claim 11, further comprising:

identifying a subset of threads included in the set of threads, wherein the subset of threads includes the first thread and the second thread; and determining that all other threads included in the subset of threads have executed the first synchronizing instruction or the second synchronizing instruction.

19. The one or more non-transitory computer-readable media of claim 18, wherein the subset of threads is identified via a mask stored in a register specified by at least one of the first synchronizing instruction or the second synchronizing instruction.

20. A system, comprising:

a memory storing instructions; and a processor that is coupled to the memory and, when executing the instructions:

determines that a first thread included in a set of threads has blocked when executing a first synchronizing instruction located at a first address in a program instruction memory;

determines that a second thread included in the set of threads has blocked when executing a second synchronizing instruction located at a second address in the program instruction memory, wherein the second address is different from the first address;

unblocks the first thread and the second thread;

returns the first thread to the first address to synchronously execute a first instruction included in a first set of instructions subsequent to the first synchronizing instruction; and returns the second thread to the second address to synchronously execute a second instruction included in a second set of instructions subsequent to the second synchronizing instruction.

\* \* \* \* \*